Sept. 2, 1924.  1,507,290
E. A. JONES
JOINT LOCKING AND REENFORCING MEANS
Filed Jan. 5, 1921
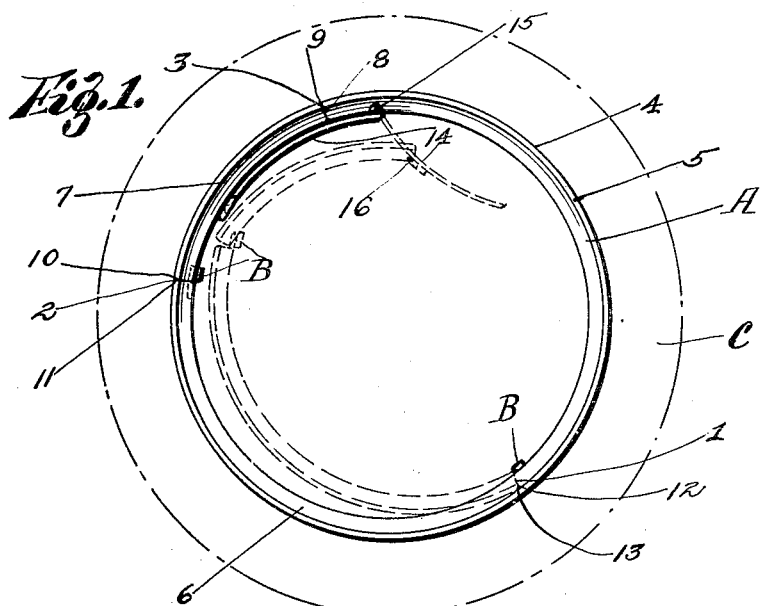
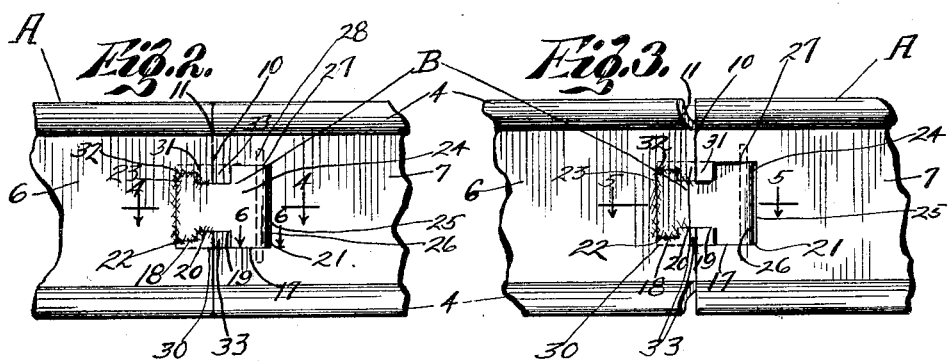
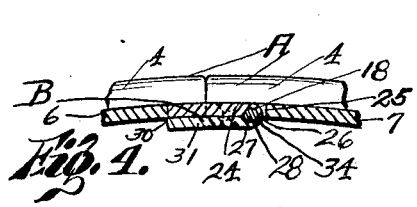 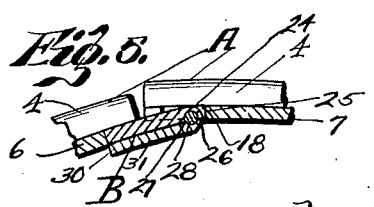
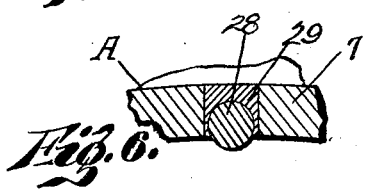
Inventor;
Eugene A. Jones;
by Raymond West Blakeslee
Att'y Patented Sept. 2, 1924.

1,507,290

UNITED STATES PATENT OFFICE.

EUGENE A. JONES, OF LOS ANGELES, CALIFORNIA, ASSIGNOR TO RICHARD J. PALMER, OF LOS ANGELES, CALIFORNIA.

JOINT LOCKING AND REENFORCING MEANS.

Application filed January 5, 1921. Serial No. 435,236.

*To all whom it may concern:*

Be it known that I, EUGENE A. JONES, a citizen of the United States, residing at Los Angeles, in the county of Los Angeles and State of California, have invented new and useful Improvements in Joint Locking and Reenforcing Means, of which the following is a specification.

This invention relates to a joint locking and reenforcing means, and particularly to a means of this character which is adaptable for a variety of purposes and uses, as will more fully appear as the description continues.

The invention has for an object the provision of a joint locking and reenforcing means, which will resist stresses in several directions, when incorporated and used with other members.

Another object is the provision of a joint locking and reenforcing means, which may be used in cooperation with members that may be divided from each other, and which means may be utilized for holding said members when they are in an abutting relation in stress resisting formation.

The joint locking and reenforcing means may be so arranged that it may be utilized in cooperation with a tire rim, which is transversely split at a plurality of points, such, for instance, as that shown in my United States Patent No. 1,325,326, granted December 16, 1919; said means would bridge the gap where the rim was transversely split.

In adapting this invention for use in a split rim, I punch portions from the rim adjacent to the transversely split portions of said rim. These punched portions may be of any configuration, that shown in the drawing being T shaped. The joint locking and reenforcing means corresponds in outline and shape to the punched portions removed from the rim, and the joint locking and reenforcing means is of a thickness corresponding to the thickness of the rim. A portion of said joint locking and reenforcing means is permanently united in one of the punched portions with one section of the split rim. This uniting is usually accomplished by welding the parts together. The opposite half of said means may loosely be received within the punched portion of the oppositely disposed end abutting rim section.

A pin member may pass transversely through said joint locking and reenforcing means and be received within the last named rim section; or, the pin may be set within a grooved portion in said rim section and permanently welded thereto. If it were desired to break the circular formation of the rim, it is obvious that the rim sections would divide at their abutting transversely split portions, one section of said rim tending to pivot about the pivot pin referred to. When the rim sections are in circular formation, the joint locking and reenforcing means would be received within the cut out portion of the rim section, and as the joint locking and reenforcing means corresponds in shape to the cut out portion in the rim, the rim sections are locked together. Furthermore, the means will bridge the gap and take the transverse strain from the pivot pin. The said means referred to being of a thickness corresponding to the thickness of the rim, does not interfere with the inner tube mechanism of any tire that may be placed on said rim. When the joint locking and reenforcing means is used in connection with a tire rim, it may be found preferable to reinforce the same by means of an auxiliary member secured to one side of said means, said side preferably being on the inner peripheral surface.

As stated, this invention is adaptable to a variety of uses, and I do not wish to confine its use to the tire rim art, as it may readily be used on containers, such as boxes, bank safes, and numerous other devices. The invention has for further objects the provision of an improved joint locking and reenforcing means, which will be superior in point of relative simplicity and inexpensiveness, taken in conjunction with durability and general efficiency and serviceability.

With the above mentioned and other objects in view, the invention consists of a novel and useful provision, formation, construction, combination, association, and inter-relation of parts, members and features, as illustrated in some of its embodiments in the accompanying drawing, described in the following detailed description, and finally pointed out in claims.

In the drawing: Figure 1 is a side elevation of a tire carrying rim, shown as incorporating the invention;

Figure 2 is a fragmentary view of a transversely split portion of certain of the rim sections, and means for uniting the same at said split portions;

Figure 3 is a view similar to Figure 2, but showing the sections as broken;

Figure 4 is a fragmentary cross-sectional view taken on the line 4—4 of Figure 2, and looking in the direction of the appended arrows;

Figure 5 is a fragmentary cross-sectional view taken on the line 5—5 of Figure 3, and looking in the direction of the appended arrows; and Figure 6 is a fragmentary cross-sectional view taken on the line 6—6 of Figure 2, and looking in the direction of the appended arrows.

Corresponding parts in all the figures are designated by the same reference characters.

Referring with particularity to the drawing, I have illustrated one embodiment of my invention in cooperation with a rim.

The rim may be designated in its entirety by A, and the improved joint locking and reenforcing means by B. The rim A comprises a ring member split transversely, as indicated at 1, 2 and 3, and provided with the usual tire retaining beads 4. Splitting the rim A forms the rim in three sections, as 5, 6 and 7. Sections 5 and 7 have their ends as 8 and 9 abutting together at the severed portion 3, when the rim A is in circular formation, such as shown in Figure 1. The opposite end of section 7, designated as 10, normally abuts against an end 11 of section 6, and the opposite end of section 5, designated as 12, abuts against the end 13 of section 6. The various sections, as 5, 6 and 7, may assume a break joint relation, as shown by the dotted lines in Figure 1, when a lever member, 14, jointed with sections 5 and 7, as shown at 15 and 16, respectively, is pulled downwardly from the full line position in Figure 1 to the dotted line position in the same figure. Normally, hinge members are fixed at the split portions 1 and 2, so that the tire rim may readily collapse under influence of movement of the lever 14. The general construction of the lever member, and its means of operation, have been fully described in my Patent No. 1,325,326, under date of December 16, 1919.

The present invention is utilized in the embodiment shown at the transversely split portions 1 and 2.

Referring to Figures 2 and 3, which may illustrate either sections 6 and 7 and the split portion 2, or the sections 5 and 6 and the split portion 1, I have illustrated the joint locking and reenforcing means B shown in cooperation with said sections. Each of the sections 6 and 7, or as stated, 5 and 6, are terminally provided at the split portions 1 and 2 with slotted portions 17 and 18, said slotted portions in the respective sections 6 and 7 extend longitudinally inwardly from the terminal ends 10 and 11, respectively, as shown at 19 and 20, and then are formed with transversely slotted portions 21 and 22 in continuation of the longitudinal portions.

The means B, as has been stated, corresponds in contour to the shape of the slotted portions in the rim sections 6 and 7. Thus the means B will assume an appearance similar to that shown in Figures 2 and 3. However, it has been found preferable to permanently unite a portion of the means B with one of the rim sections, as, for instance, section 6, as shown by the cross lines 23, said cross lines representing welding. It might also be noted that the means B, in said figures, is I shaped. However, any other shape would accomplish the necessary results, provided the means B was provided with a head or heads, or had some angularly disposed portions for engagement with correspondingly angled slotted portions in the rim sections. The head, as 24, of the means B, fits. as has been stated, in the slotted portions 17 and 21; however, in order to allow play between the means B and the slotted portion 21, and particularly the edge portions shown as 25, there is a spaced relation between the end 26 of the means B and the portion 25. The means B may be formed with a transverse bore therethrough, as illustrated at 27. A pin 28 may be confined within said bore 27, and having its ends joined with, or held to, the rim section 7. This may easily be accomplished by slotting a portion of said rim section 7, as shown at 29, and then spot welding the ends of the pin 28 within the channel portion 29 of said rim section. Thus, when the rim sections 6 and 7 have their ends 10 and 11 abutting against each other, they are held in close relation with the means B, spanning the split portion between the same. In Figure 3, the rim section 6 has been rotated downwardly, resultant upon operation of the handle 14, as shown in Figure 1. In this case, the means B is still retained within the slotted portion of the rim section 7, but at an angle thereto. The movement up and down of the means B within the slotted portion of the rim 7 is very slight, so that the edge 26 of the means B will not in any manner injure a tire, or its inner tube. It may be found preferable to place a backbone, or reenforcing means, upon the means B, and on the inner peripheral surface thereof, as illustrated at 30. Referring to sections 5, 6 and 7, the reenforcing means 31 may be united with the means B, by spot welding the same together, or by riveting, or any other means, and the member 31 is of a length corresponding to the length of the means B, and of a width corresponding to the movable end thereof.

It will be observed in Figures 2 and 3 that the end of the means B, which is permanently united with the rim section 6, is of a lesser width than the opposite end of said means, and that the member 31, shown by dotted lines, has an over-lapping relation to said end, as illustrated at 32. The means 31 obviously does not interfere with movement of the means B, but greatly aids in strengthening and stiffening said means. The member 31, of course, spans the split portion of the rim sections, and in addition, tends to strengthen the parts illustrated at 33, it being observed in the figures that the member 31 is rectangular in form, while the means B is I shaped. When the member 31 is used in cooperation with the means B, the pin 28 may be passed through a bore 34, located between the member 31 and the means B.

The means B makes it possible to bring the terminal ends of the rim sections, as 6 and 7, and 5 and 6, in a very tight relation to each other. Furthermore, the particular manner in which the means B is joined with the various sections of the tire rim, causes the rim sections to lock when they are in circular formation, for the holding of a tire C thereon.

It is obvious that many changes, variations and modifications may be made in the departure from the particular description and showing of the accompanying drawing, in adapting the invention to varying conditions and requirements of use and service without departing from the true spirit of the invention.

What I claim and desire to secure by Letters Patent is:

1. A device of the character disclosed, comprising two relatively movable members, and means for maintaining end portions thereof in opposed relation and permitting relative movement thereof, the same comprising a part attached to one of said members, and connected with the other of said members so as to permit relative movement between the members; there being a slotted portion of one of said members, and said part extending between the members having a headed end part adapted to be received in said slotted portion in interlocking relation; said headed end portion being hingedly united with said member having said slotted portion at a point remote from an end portion thereof.

2. In combination, a transversely severed tire carrying rim, and locking and reenforcing means applied to the ends of the rim and spanning the point of severance in the rim; said locking and reenforcing means comprising a part attached to one of said rim ends and hingedly connected at a point remote from the point of severance with the other of said rim ends and having a headed end portion interlocking with one of said rim ends in a recessed portion thereof; said last named part being flanged to over-lap one of said rim ends.

3. In a device of the character disclosed, a pair of adjacent abutting rim sections, held in break-joint relation, the abutting end of one of said rim sections being provided with a projecting member, and the other of said rim sections being formed with a slot to receive said projecting member, there being a pin mounted in said member having said slotted portion and spanning a portion of the slot and extending through a transverse bore in said projecting member at a point remote from the break-joint of the rim sections and whereby the said rim sections are movable relative to each other.

In testimony whereof, I have signed my name to this specification in the presence of two subscribing witnesses.

EUGENE A. JONES.

Witnesses:
   RAYMOND IVES BLAKESLEE.
   MILDRED LEACH.